(12) United States Patent
Lu et al.

(10) Patent No.: US 11,809,683 B2
(45) Date of Patent: Nov. 7, 2023

(54) DISPLAY METHOD, DISPLAY DEVICE AND STORAGE MEDIUM

(71) Applicant: BEIJING XIAOMI MOBILE SOFTWARE CO., LTD., Beijing (CN)

(72) Inventors: Yizhan Lu, Beijing (CN); Xiaoyong Xi, Beijing (CN); Yiwei Huang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 145 days.

(21) Appl. No.: 16/856,653

(22) Filed: Apr. 23, 2020

(65) Prior Publication Data
US 2020/0341596 A1 Oct. 29, 2020

(30) Foreign Application Priority Data
Apr. 25, 2019 (CN) .......................... 201910340630.6

(51) Int. Cl.
*G06F 3/0482* (2013.01)
*G06F 3/04845* (2022.01)
*G06F 11/34* (2006.01)
*G06F 21/33* (2013.01)

(52) U.S. Cl.
CPC ........ *G06F 3/0482* (2013.01); *G06F 3/04845* (2013.01); *G06F 11/3438* (2013.01); *G06F 21/33* (2013.01); *G06F 2203/04803* (2013.01)

(58) Field of Classification Search
CPC .... G06F 11/3438; G06F 16/958; G06F 21/33; G06F 2203/04803; G06F 3/0482; G06F 3/04845
See application file for complete search history.

(56) References Cited

U.S. PATENT DOCUMENTS

| | | | |
|---|---|---|---|
| 2006/0026145 A1* | 2/2006 | Beringer | G06F 3/0482 |
| 2012/0060121 A1* | 3/2012 | Goldberg | G06F 3/0482 |
| | | | 715/823 |
| 2013/0097279 A1* | 4/2013 | Polis | H04L 67/00 |
| | | | 709/217 |
| 2013/0262966 A1* | 10/2013 | Wu | G06F 16/9535 |
| | | | 715/202 |
| 2013/0332960 A1* | 12/2013 | Young | H04N 21/4782 |
| | | | 725/41 |

(Continued)

FOREIGN PATENT DOCUMENTS

EP 3 407 220 A1 11/2018

OTHER PUBLICATIONS

Extended European Search Report dated Jun. 23, 2020 in European Patent Application No. 20169821.4, 8 pages.

*Primary Examiner* — Jennifer N Welch
*Assistant Examiner* — Reji Kartholy
(74) *Attorney, Agent, or Firm* — Oblon, McClelland, Maier & Neustadt, L.L.P.

(57) ABSTRACT

The present disclosure relates to a display method, a display device, and a storage medium, which are used to solve the technical problem that contents of only one application can be displayed on a same interface in related technologies. The display method can include receiving a content viewing instruction, acquiring content data of a plurality of content providers in response to the content viewing instruction, and displaying the content data of the plurality of content providers on an interface in a form of stitched segments.

13 Claims, 5 Drawing Sheets

(56) References Cited

U.S. PATENT DOCUMENTS

| | | | |
|---|---|---|---|
| 2014/0039995 A1* | 2/2014 | Ngo | G06Q 50/01 |
| | | | 705/14.16 |
| 2015/0180944 A1* | 6/2015 | Simpson | G06F 3/0482 |
| | | | 709/203 |
| 2016/0173924 A1* | 6/2016 | Gordon | H04N 21/482 |
| | | | 725/116 |
| 2016/0267094 A1 | 9/2016 | Darnell et al. | |
| 2018/0322135 A1 | 11/2018 | Darnell et al. | |
| 2018/0341501 A1 | 11/2018 | Lu et al. | |
| 2019/0138166 A1* | 5/2019 | Lemp | G06F 16/9558 |
| 2020/0014744 A1* | 1/2020 | Nicholas | G06F 16/60 |
| 2020/0216089 A1* | 7/2020 | Garcia | G06F 16/3329 |

* cited by examiner

 Zhihu · Michael

 Michael 282694 pays attentions to the question One day ago

Which basic sciences will affect the Internet technology industry in the next decades?Integration and innovation ofIndustrial Internet and Consumer Internet...

Question description: this question is the first one of ten questions in "Zhihu 2018 'Internet Visionary'", from Pony Ma (Zhihu ID: ponyma). More information...

1932 answerers, 53,916 concerns

 Michael 282694 thumbs-up Five days ago

If this technology does not exist on your phone, it is scare!

Glory: some user notice that the phone itself enables "Loan"service:Ibelieve most of you have known this phenomenon... 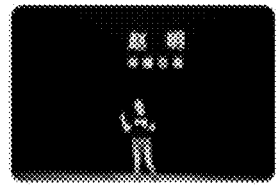

45 supports, 2 comments

  

FIG. 4

DISPLAY METHOD, DISPLAY DEVICE AND STORAGE MEDIUM

CROSS-REFERENCE TO RELATED APPLICATION

This application claims priority to Chinese Patent Application No. 201910340630.6 filed on Apr. 25, 2019, the entire contents of which are incorporated herein by reference.

FIELD

The present disclosure relates to a field of electrical devices, in particular, to a display method, a display device and a storage medium.

BACKGROUND

In the current mobile Internet industry, people are spending more and more time in content applications. Most content, such as news information, short videos, forum posts, and the like, exist in various content applications in the form of information flows.

SUMMARY

The present disclosure provides a display method, a display device, and a storage medium. A first aspect of an embodiment of the present disclosure provides a display method that can include receiving a content viewing instruction, acquiring content data of a plurality of content providers in response to the content viewing instruction, and displaying the content data of the plurality of content providers on a display interface in a form of stitched segments.

A second aspect of an embodiment of the present disclosure provides a display device. The display device can include a receiving module that is configured to receive a content viewing instruction. The display device can further include an acquiring module that is configured to acquire content data of a plurality of content providers in response to the content viewing instruction, and a displaying module that is configured to insert the content data of the plurality of content providers in a form of stitched segments into a content information aggregation stream, to display the content data of the plurality of content providers on an interface in segments.

A third aspect of an embodiment of the present disclosure provide a non-transient computer-readable storage medium having stored computer programs thereon which, when executed by a processor, implement steps of the method according to any one of the above first aspect.

A fourth aspect of an embodiment of the present disclosure provides a display device that can include a processor, and a memory for storing instructions executable by the processor. The processor can be configured to receive a content viewing instruction, acquire content data of a plurality of content providers in response to the content viewing instruction, and display the content data of the plurality of content providers on an interface in a form of stitched segments.

Other features and advantages of the present disclosure will be described in detail in the detailed description that follows.

BRIEF DESCRIPTION OF THE DRAWINGS

The drawings are used to provide a further understanding of the present disclosure, and constitute a part of the specification. Together with the following specific embodiments, the drawings are used to explain the present disclosure, but do not constitute a limitation on the present disclosure. In the drawings:

FIG. 4 is a display interface of one segment according to an exemplary embodiment of the present disclosure.

DETAILED DESCRIPTION

Particular embodiments of the present disclosure will be described in detail below in conjunction with the accompanying drawings. It should be understood that the particular embodiments described herein are only used to illustrate and explain the present disclosure, and are not intended to limit the present disclosure.

The inventor of the present disclosure has discovered in a process of reading information that an ordinary user's daily time for reading and acquiring all kinds of contents is scattered in different content applications due to the separation and isolation of contents of various content applications. For example, the user may browse Microblog for a while, then browse ZhiHu for a while, and then read news of Headlines Today for a while. That is, a same interface may only display the contents of one application, which leads to a fragmentation of user's reading experience.

Figure 1:
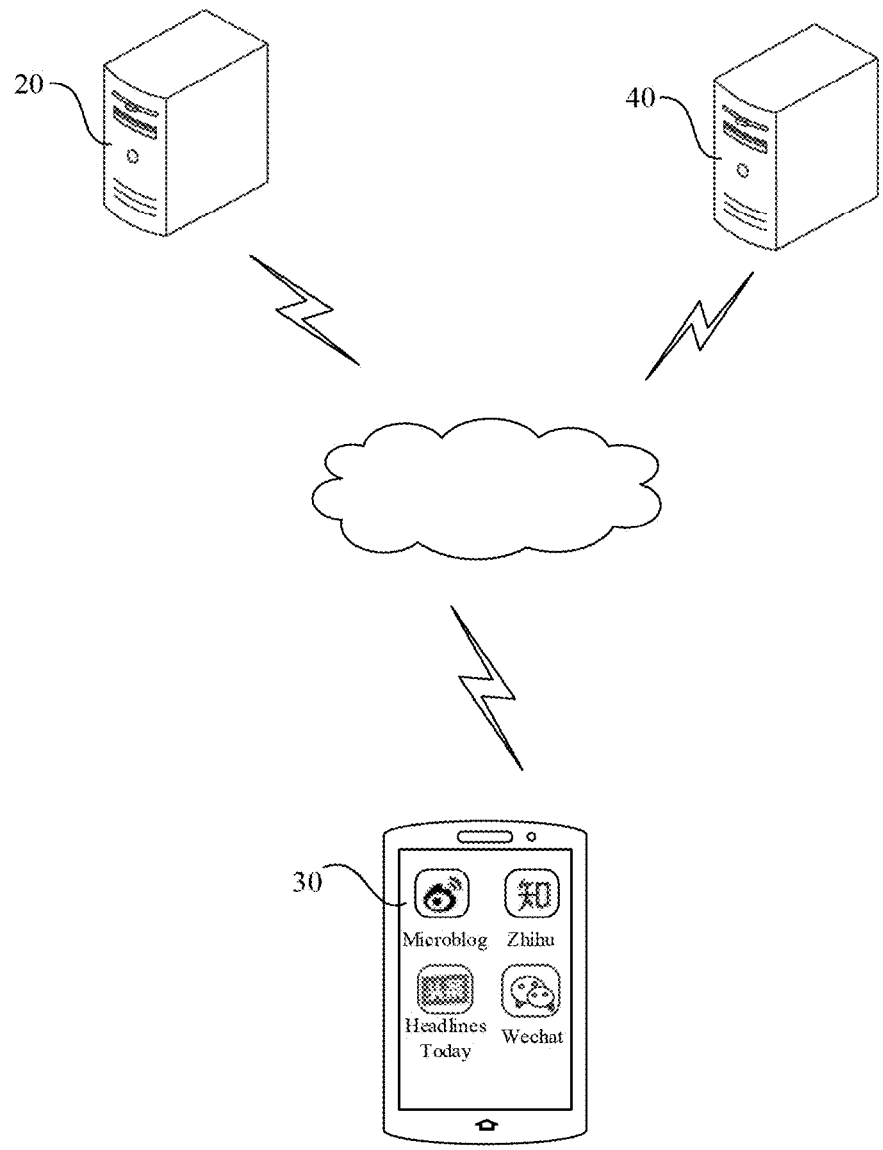
FIG. 1 is a schematic diagram of an implementation environment according to an exemplary embodiment of the present disclosure.

FIG. 1 is a schematic diagram of an implementation environment according to an example embodiment. As illustrated in FIG. 1, the implementation environment may include a content sharing server 20, a terminal 30, and a content provider 40. The content sharing server 20 is provided with a content sharing database storing contents provided by content partners who are willing to cooperate and share the contents with others. The terminal 30 may login to the content sharing server 20 through network to acquire the contents in the content sharing database. The content provider 40 is a content partner who is unwilling to share contents, and the terminal 30 needs to acquire the contents of the content provider 40 through a data interface provided by the content provider 40.

The terminal 30 may be any user device that accesses a network service through a mobile communication network. For example, the user device can be a smart phone, a tablet computer, or a notebook computer. FIG. 1 illustrates an embodiment where the terminal 30 is a smart phone.

In particular, the terminal 30 may be installed with various applications. That application initiates a network connection request when accessing the network service. Based on the network connection request, the mobile terminal 30 may connect to the mobile communication network and access the network service. For example, the applications which are installed on the terminal 30 illustrated in FIG. 1 include at least Microblog, Zhihu, Headlines Today, and WeChat.

Figure 2:
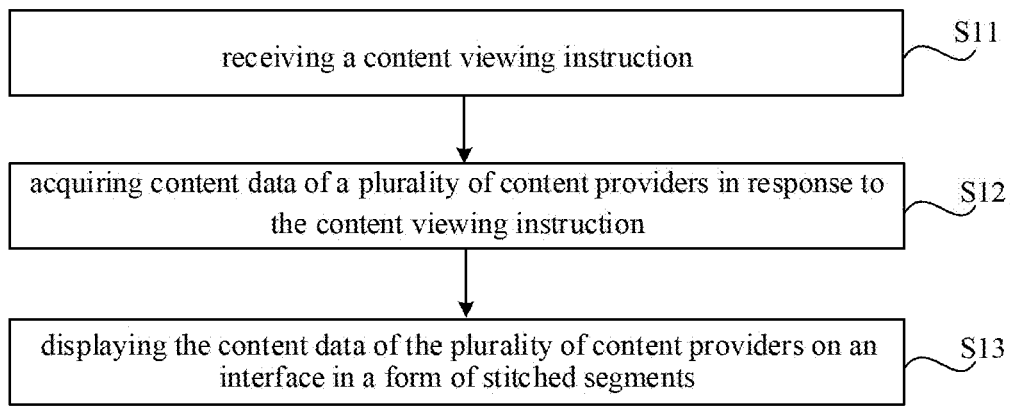
FIG. 2 is a flowchart of a display method according to an exemplary embodiment of the present disclosure.

FIG. 2 is a flowchart of a display method according to an examplary embodiment, so as to solve the technical problem that contents of only one application can be displayed on a same interface in the related technologies. The display method illustrated in this embodiment may be applied to the terminal illustrated in FIG. 1. As illustrated in FIG. 2, the display method includes the followings.

At block S11, a content viewing instruction is received.

At block S12, content data of a plurality of content providers is acquired in response to the content viewing instruction.

At block S13, the content data of the plurality of content providers is displayed on an interface in a form of stitched segments.

The present disclosure can be applied to a single shot application App of content aggregation-type, and can also be applied to a content aggregation-type application built into an operating system, such as an aggregation-type application plugin provided on a system desktop. Therefore, at block S11, the content viewing instruction may be an instruction that is generated when the user operates the single shot application App, or may be an instruction that is generated when the user opens the aggregation-type application plugin.

After receiving the content viewing instruction, the step at block S12 is executed, in which content data of a plurality of content providers is acquired in response to the content viewing instruction. Since contents may be the core asset of many content applications, it is difficult to enable all content applications to allow their own contents to be opened out and stored in content aggregation-type products. When the content provider is unwilling to open its content to be stored in the content sharing database, the terminal 30 may acquire the content data through the data interface provided by the content provider.

When the content provider is willing to open its content to be stored in the content sharing database, the terminal 30 may login to the content sharing server 20 through the network, and thus acquire the content data shared by content provider from the content sharing database.

Figure 3:
FIG. 3 is a display interface of multiple segments according to an exemplary embodiment of the present disclosure.

After the content data is acquired, the step at block S13 is executed, in which content data of the plurality of content providers in the form of stitched segments are inserted into a content information aggregation stream to display the content data of the plurality of content providers on the interface in segments. FIG. 3 is a display interface of multiple segments according to an examplary embodiment of the present disclosure. As illustrated in FIG. 3, the contents of content providers who cannot provide their own contents into the storage are packaged as a whole and then are inserted into the information stream in a form of "segments", such that users will perceive them into a content segment of a content provider when reading the information stream, and continuously read this content provider's contents for the following period of time.

Alternatively, as illustrated in FIG. 3, a content organization mode supports stitching multiple continuous segments together, each segment corresponds to a content provider, and a preset amount of content data is displayed in each segment on the interface. In FIG. 3, the segment where Zhihu is located shows contents of two articles. The user can perceive the switching between different segments by means of an in-stream top head and related main colors and operation functions, and the like, for example perceiving the switching from the segment where Zhihu is located to the segment where Microblog is located.

As the content of each segment does not appear indefinitely, for users who intend to keep reading more content in this segment, the display method further can further include triggering a content loading instruction on the interface corresponding to the current segment and extending the current segment to display more content data than the preset amount of content data. As illustrated in FIG. 3, a "Load More" option may be provided at the end of each segment, and the content loading instruction can be an instruction generated when a user clicks on the "Load More" option, thereby allowing the user to quickly "extend" this segment. For example, in FIG. 3, the segment where Zhihu is located only shows two articles at present. After clicking the "Load More" option, two more articles may be loaded.

Of course, in other embodiments, the terminal may be also triggered to generate the content loading instruction by recognizing a touch trajectory of the user's finger on a touch screen. For example, the content loading instruction will be generated if the user's finger draws a circle on the interface corresponding to the Zhihu segment.

In order to provide users with a quick jumping ability of fast switching to other segments and thus avoid encountering the segment recommendations that the user does not like, the display method further can include triggering a content switching instruction on the interface corresponding to the current segment, and displaying the content data of other segments on the interface. FIG. 4 is a display interface of one segment according to an example embodiment of the present disclosure. As illustrated in FIG. 4, a functional button, such as a switching button, may be provided at the end of each segment. The content switching instruction may be an instruction generated when the user clicks the switching button, so that the current segment is switched to the next segment. For example, the interface will jump to display the next segment, such as a Microblog segment, instead of the current segment, such as a Zhihu segment, if the switching button at the bottom of the current segment is clicked.

Of course, in other embodiments, the terminal may also be triggered to generate the content switching instruction by recognizing the touch trajectory of the user's finger on the touch screen. For example, the content switching instruction will be generated if user's finger slides upwards on the interface of Zhihu segment for more than a distance of 3 cm.

In the process of reading each segment, in order to allow a user to separately login to an application corresponding to each segment, the display method can further include triggering a login instruction on the interface corresponding to the current segment, acquiring a login page from a data interface corresponding to the content provider for a user to enter login information, and saving and acquiring a user identity token sent by the content provider through the data interface if the login is successful.

The login instruction may be an instruction generated after the user selects the login option provided on the interface corresponding to each segment. Then, the login instruction of the terminal 30 is sent to the content provider (i.e., the content provider 40) corresponding to the segment. The content provider sends the login page to the terminal 30 through the data interface. The user may enter authentication information, such as a username and a password into the login page displayed on the terminal 30. After the login is successful, the terminal 30 may acquire the user identity token through the OAuth protocol and the like, and save the user identity token, so that more contents related to the current user are accessible using the user identity token as a parameter for subsequently acquiring contents in segments.

In order to determine a displaying sequence of different segments according to the user's preferences, the present disclosure may also acquire reading behavior data of the user for an application within a content information aggregation stream and/or a terminal, and then may adjust the displaying sequence of content data of the plurality of content providers on the interface according to the reading behavior data. For example, if the user reads the Microblog segment in content information aggregation stream for a longer time than the Zhihu segment, the Microblog segment may be displayed in front of the Zhihu segment. As another example, if the user spends more time using the Microblog application in the terminal than using the Zhihu application, the Microblog segment can be displayed in front of the Zhihu segment.

The present disclosure provides a method of organizing information flows for presentation in segmented content, in which contents of multiple applications are inserted into the traditional information flows in the form of "segments", such that users may read the information of multiple applications in one content flow, which avoids the fragmentation of reading experience and improves the user's reading experience.

Furthermore, in the present disclosure, the content segment of certain content provider can be directly inserted into a content aggregation information flow, so that a content partner can provide its contents and algorithms by itself, and it is unnecessary to store the contents in advance, thereby eliminating the doubts about content aggregation cooperation. Under the premise of protecting its content assets, it is possible to promote its core high-quality content to more users, increase exposure to contents of the content partner and simultaneously provide users with the core value of all contents in one place, which helps to build a new distribution model of contents and applications.

In addition, when reading each segment, some visual and functional changes can be made to the content aggregation stream accordingly to match the user's reading immersion, while supporting the login to the application corresponding to this segment, so that the personalized contents related to users' identities may be acquired in content aggregation stream.

It is noteworthy that, as for the method embodiment shown in FIG. 2, they are all described as a combination of a series of actions for the sake of simplicity, but those skilled in the art should know that the present disclosure is not limited by the sequence of actions described. Secondly, those skilled in the art should also know that the embodiments described in the specification are merely preferred embodiments, and the actions involved are not necessarily required by the present disclosure.

Figure 5:
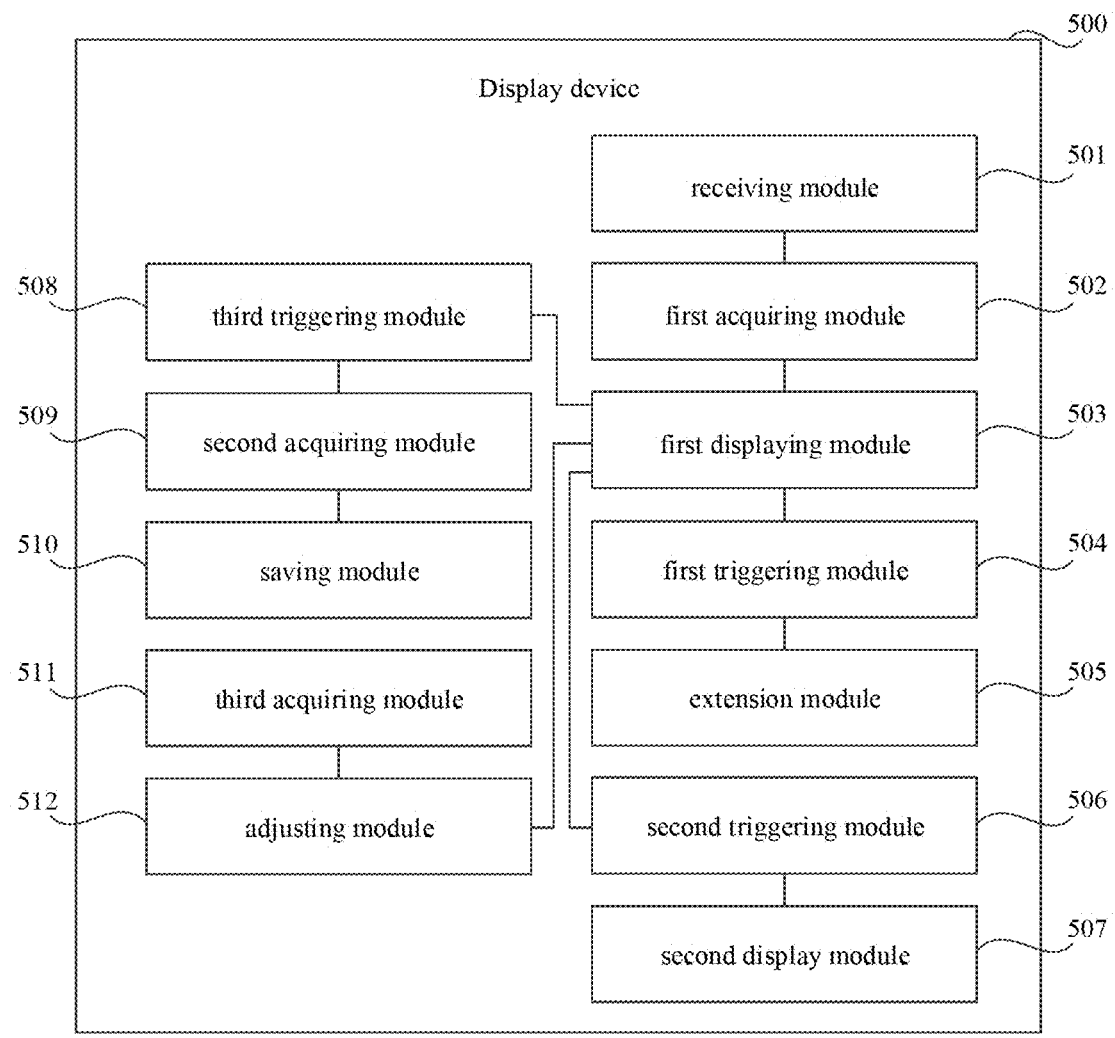
FIG. 5 is a block diagram of a display device according to an exemplary embodiment of the present disclosure.

FIG. 5 is a block diagram of a display device according to an exemplary embodiment of the present disclosure. As illustrated in FIG. 5, the display device 500 can include a receiving module 501, a first acquiring module 502, and a first display module 503.

The receiving module 501 is configured to receive a content viewing instruction.

The first acquiring module 502 is configured to acquire content data of a plurality of content providers in response to the content viewing instruction.

The first display module 503 is configured to display the content data of the plurality of content providers on an interface in a form of stitched segments.

Alternatively, the first acquiring module 502 can be further configured to acquire the content data from a data interface corresponding to the content provider, and/or acquire the content data shared by the content provider from a content sharing database.

Alternatively, each segment corresponds to one content provider, and the displaying module 503 can be further configured to display a preset amount of content data in each segment on the interface.

Alternatively, as illustrated in FIG. 5, the display device 500 can further include a first triggering module 504 and an extension module 505. The first triggering module 504 is configured to trigger a content loading instruction on the interface corresponding to a current segment. The extension module 505 is configured to extend the current segment to display more content data than the preset amount of content data.

As further illustrated in FIG. 5, the display device 500 can further include a second triggering module 506 and a second display module 507. The second triggering module 506 is configured to trigger a content switching instruction on the interface corresponding to the current segment. The second display module 507 is configured to display content data of other segments on the interface.

The display device 500 can further include a third triggering module 508, a second acquiring module 509, and a saving module 510. The third triggering module 508 is configured to trigger a login instruction on the interface corresponding to the current segment. The second acquiring module 509 is configured to acquire a login page from a data interface corresponding to the content provider for a user to enter login information. The saving module 510 is configured to save and acquire a user identity token sent by the content provider through data interface if the login is successful.

As illustrated in FIG. 5, the display device 500 can also include a third acquiring module 511 and an adjusting module 512. The third acquiring module 511 is configured to acquire reading behavior data of a user for an application within a content information aggregation stream and/or a terminal. The adjusting module 512 is configured to adjust a display sequence of the content data of the plurality of content providers on the interface according to the reading behavior data.

Regarding the device in the above embodiments, specific manners in which each module performs operations have been described in detail in the embodiments of the method, and will not be described in detail here.

The present disclosure also provides a display device that can include a processor, and a memory for storing instructions executable by the processor. The processor is configured to receive a content viewing instruction, acquire content data of a plurality of content providers in response to the content viewing instruction, and insert the content data of the plurality of content providers in a form of stitched segments into a content information aggregation stream, to display the content data of the plurality of content providers on the interface in segments.

The present disclosure also provides a computer-readable storage medium having stored computer programs thereon which, when executed by a processor, implement the steps of the display method described in any one of the above-mentioned alternative embodiments.

Figure 6:
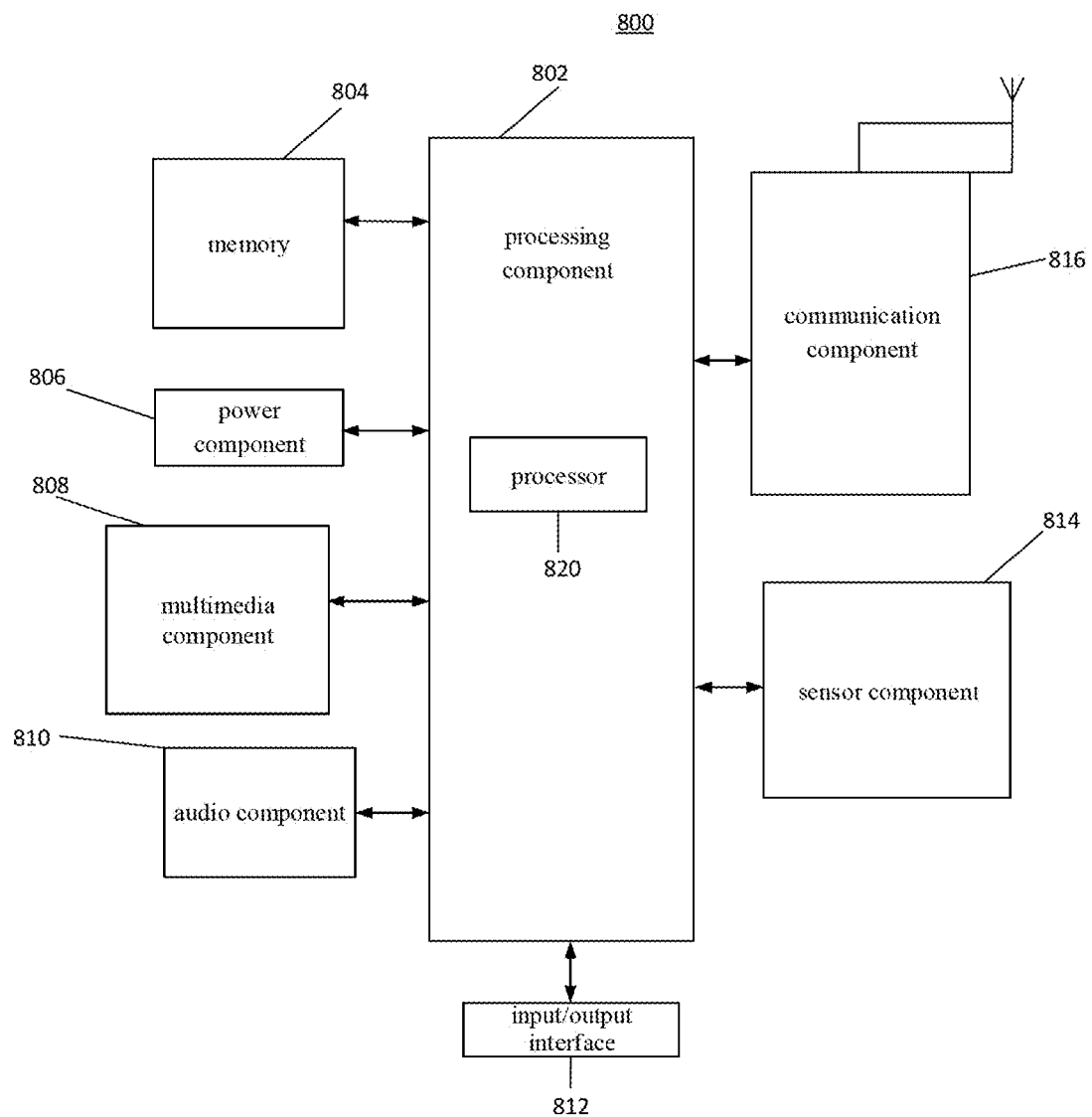
FIG. 6 is another block diagram of a display device according to an exemplary embodiment of the present disclosure.

FIG. 6 is another block diagram of a display device 800 according to an example embodiment. For example, the display device 800 may be a mobile phone, a computer, a tablet device, and the like. With reference to FIG. 6, the display device 800 may include one or more of the following components: a processing component 802, a memory 804, a power component 806, a multimedia component 808, an audio component 810, an input/output (I/O) interface 812, and a sensor component 814, and a communication component 816.

The processing component 802 generally controls overall operations of the display device 800, such as operations associated with display, telephone calls, data communications, camera operations, and recording operations. The processing component 802 may include one or more processors 820 to execute instructions to complete all or part of steps of the above display method. In addition, the processing component 802 may include one or more modules to facilitate the interaction between the processing component 802 and other components. For example, the processing component 802 may include a multimedia module to facilitate the interaction between the multimedia component 808 and processing component 802.

The memory 804 is configured to store various types of data to support operations on the display apparatus 800. Examples of these data include instructions for any application or method for operating on the display device 800, contact data, phone books data, messages, pictures, videos, and the like. The memory 804 may be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power component 806 provides power to various components of display device 800. The power component 806 may include a power management system, one or more power sources, and other components associated with generating, managing, and distributing power for display device 800.

The multimedia component 808 includes a screen that provides an output interface between the display device 800 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, slides, and gestures on the touch panel. The touch sensor may not only sense a boundary of touching or sliding actions, but also detect duration and pressure related to the touching or sliding operation. In some embodiments, the multimedia component 808 includes a front camera and/or a rear camera. When the device 800 is in an operation mode, such as a shooting mode or a video mode, the front camera and/or rear camera may receive external multimedia data. Each front camera and rear camera may be a fixed optical lens system or have focal length and optical zoom capability.

The audio component 810 is configured to output and/or input audio signals. For example, the audio component 810 includes a microphone (MIC) that is configured to receive an external audio signal when the display device 800 is in an operation mode, such as a calling mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface module. The above peripheral interface module may be keyboards, click wheels, buttons and the like. These buttons may include, but are not limited to a home button, a volume button, an initiate button, and a locking button.

The sensor component 814 includes one or more sensors for providing status assessments in various aspects for the display device 800. For example, the sensor component 814 may detect the on/off state of display device 800 and relative positioning of the component (e.g., which is the display and keypad of device 800). The sensor component 814 may also detect the display device 800 or changes on the position of one component of display device 800, the presence or absence of the user's contact with display device 800, the orientation or acceleration/deceleration of display device 800, and the temperature changes of display device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the device 800 and other devices. The display device 800 may access a wireless network based on communication standards, such as WiFi, 2G or 3G, or a combination thereof. In one exemplary embodiment, the communication component 816 receives a broadcast signal or broadcast-related information from an external broadcast management system via a broadcast channel In an exemplary embodiment, the communication component 816 further includes a near field communication (NFC) module to facilitate short-range communications. For example, the NFC module may be implemented based on radio frequency identification (RFID) technology, infrared data association (IrDA) technology, ultra wideband (UWB) technology, Bluetooth (BT) technology, and other technologies.

In an example embodiment, the display device 800 may be implemented by one or more application specific integrated circuits (ASICs), digital signal processors (DSPs), digital signal processing devices (DSPDs), programmable logic devices (PLDs), field programmable gate arrays (FPGAs), controller, microcontrollers, microprocessors, or other electronic components to perform the display method described above.

In an example embodiment, a non-transitory computer-readable storage medium including instructions, such as a memory 804 including instructions, may be provided. The above instructions may be executed by the processor 820 of display device 800 to complete the display method. For example, the non-transitory computer-readable storage medium may be a ROM, a random access memory (RAM), a CD-ROM, a magnetic tape, a floppy disk, an optical data storage device, and the like.

The preferred embodiments of the present disclosure have been described in detail above in conjunction with the accompanying drawings; however, the present disclosure is not limited to the particular details in the above embodiments. Within the scope of technical concept of the present disclosure, various simple modifications may be made to the technical solutions of the present disclosure. These simple modifications all belong to the protection scope of the present disclosure.

In addition, it should be noted that the particular technical features described in the foregoing particular embodiments may be combined in any suitable manner without contradiction. In order to avoid unnecessary repetition, various possible combinations are not further explained in this disclosure.

In addition, various embodiments of the present disclosure can also be arbitrarily combined, as long as it does not violate the idea of the present disclosure, and it should also be regarded as the content disclosed in the present disclosure.

What is claimed is:

1. A method of displaying, performed by a terminal installed with a single shot application (APP) of content aggregation-type and a plurality of APPs other than the single shot APP, the method comprising:
   receiving a content viewing instruction in the single shot APP;
   acquiring content data from the plurality of APPs in response to the content viewing instruction; and
   displaying the content data from the plurality of APPs on a display interface of the single shot APP in a form of stitched segments in a content information aggregation stream, wherein a display sequence of the content data from the plurality of APPs is adjusted according to a reading behavior data of a user for an APP within the content information aggregation stream;
   wherein the method further comprises:
   in response to selecting a login option provided on a current segment within the stitched segments in the content information aggregation stream, sending a login instruction to a first APP corresponding to the current segment;
   acquiring, through a data interface provided by the first APP, a login page of the first APP, for the user to enter login information; and
   acquiring a user identity token sent by the first APP through the data interface if login is successful, and saving the user identity token as a parameter to acquire personalized contents related to the user for subsequently acquiring contents in segments from the first APP;
   wherein the method further comprises:
   triggering a content loading instruction, in response to selecting a load-more option provided on the current segment; and
   extending the current segment to display additional pieces of content data from the first APP.

2. The method according to claim 1, wherein each segment of the stitched segments corresponds to one APP and displaying the content data from the plurality of APPs on the display interface in the form of stitched segments further comprises:
   displaying a preset amount of content data in each segment of the stitched segments on the display interface.

3. The method according to claim 2, further comprising:
   triggering a content loading instruction, in response to recognizing a preset touch trajectory of the user's finger on a touch screen; and
   extending the current segment to display additional pieces of content data from the first APP.

4. The method according to claim 1, further comprising:
   triggering a content switching instruction in response to selecting a switching button provided on the current segment or in response to recognizing a preset touch trajectory of the user's finger on a touch screen; and
   displaying by the single shot APP, the content data of other segments of the stitched segments on the display interface.

5. The method of claim 1, wherein each of the stitched segments is provided with a load-more option, a login option and a switching button, and the stitched segments have different main colors and different top heads.

6. A display device, installed with a single shot application (APP) of content aggregation-type and a plurality of APPs other than the single shot APP, the display device comprising:
   a processor; and
   a memory for storing instructions executable by the processor;
   wherein the processor is configured to:
   receive a content viewing instruction in the single shot APP;
   acquire content data from the plurality of APPs in response to the content viewing instruction; and
   insert the content data from the plurality of APPs in a form of stitched segments into a content information aggregation stream, to display the content data of the plurality of APPs on a display interface of the single shot APP in segments in a content information aggregation stream, wherein a display sequence of the content data from the plurality of APPs is adjusted according to a reading behavior data of a user for an APP within the content information aggregation stream;
   wherein the processor is further configured to in response to selecting a login option provided on a current segment within the stitched segments in the content information aggregation stream, send a login instruction to a first APP corresponding to the current segment; acquire, through a data interface provided by the first APP, a login page of the first APP for the user to enter login information; acquire a user identity token sent by the first APP through the data interface if login is successful, and save the user identity token as a parameter to acquire personalized contents related to the user for subsequently acquiring contents in segments from the first APP;
   wherein the processor is further configured to trigger a content loading instruction, in response to selecting a load-more option provided on the current segment; and extend the current segment to display additional pieces of content data from the first APP.

7. The device according to claim 6, wherein each segment of the stitched segments corresponds to one APP and the processor is configured to display the content data of the plurality of APPs on the display interface of the single shot APP in the form of stitched segments by:
   displaying a preset amount of content data in each segment of the stitched segments on the display interface.

8. The device according to claim 7, wherein the processor is further configured to:
   trigger a content loading instruction, in response to recognizing a preset touch trajectory of the user's finger on a touch screen; and
   extend the current segment to display additional pieces of content data from the first APP.

9. The device according to claim 6, wherein the processor is further configured to:
   trigger a content switching instruction in response to selecting a switching button provided on the current segment or in response to recognizing a preset touch trajectory of the user's finger on a touch screen; and
   display the content data of other segments on the display interface.

10. A non-transitory computer-readable storage medium having stored computer programs thereon which, when executed by a processor of a terminal installed with a single shot application (APP) of content aggregation-type and a plurality of APPs other than the single shot APP, causes the processor to perform a method of displaying, the method comprising:
- receiving a content viewing instruction in the single shot APP;
- acquiring content data from the plurality of APPs in response to the content viewing instruction; and
- displaying the content data from the plurality of APPs on a display interface of the single shot APP in a form of stitched segments in a content information aggregation stream, wherein a display sequence of the content data from the plurality of APPs is adjusted according to a reading behavior data of a user for an APP within the content information aggregation stream;
- wherein the method further comprises:
- in response to selecting a login option provided on a current segment within the stitched segments in the content information aggregation stream, sending a login instruction to a first APP corresponding to the current segment;
- acquiring, through a data interface provided by the first APP, a login page of the first APP for the user to enter login information; and
- acquiring a user identity token sent by the first APP through the data interface if login is successful, and saving the user identity token as a parameter to acquire personalized contents related to the user for subsequently acquiring contents in segments from the first APP;

wherein the method further comprises:
- triggering a content loading instruction, in response to selecting a load-more option provided on the current segment; and
- extending the current segment to display additional pieces of content data from the first APP.

11. The non-transitory computer-readable storage medium according to claim 10, wherein, each segment corresponds to one APP, displaying the content data of the plurality of APPs on the display interface in the form of stitched segments comprises:
- displaying a preset amount of content data in each segment on the display interface.

12. The non-transitory computer-readable storage medium according to claim 11, wherein the method further comprises:
- triggering a content loading instruction, in response to recognizing a preset touch trajectory of the user's finger on a touch screen; and
- extending the current segment to display additional pieces of content data from the first APP.

13. The non-transitory computer-readable storage medium according to claim 10, wherein the method further comprises:
- triggering a content switching instruction in response to selecting a switching button provided on the current segment or in response to recognizing a preset touch trajectory of the user's finger on a touch screen; and
- displaying the content data of other segments on the display interface.

* * * * *